(12) United States Patent
Jin et al.

(10) Patent No.: US 11,954,142 B2
(45) Date of Patent: Apr. 9, 2024

(54) METHOD AND SYSTEM FOR PRODUCING STORY VIDEO

(71) Applicant: Snow Corporation, Seongnam-si (KR)

(72) Inventors: Junghwan Jin, Seongnam-si (KR); Sungwook Kim, Seongnam-si (KR); Sangho Choi, Seongnam-si (KR); Byung-Sun Park, Seongnam-si (KR); Wonhyo Yi, Seongnam-si (KR); Seongyeop Jeong, Seongnam-si (KR); Noah Hahm, Seongnam-si (KR); Jimin Kim, Seongnam-si (KR); Hyeongbae Shin, Seongnam-si (KR)

(73) Assignee: Snow Corporation, Gyeonggi-do (KR)

(*) Notice: Subject to any disclaimer, the term of this patent is extended or adjusted under 35 U.S.C. 154(b) by 0 days.

(21) Appl. No.: 18/323,796

(22) Filed: May 25, 2023

(65) Prior Publication Data

US 2023/0297608 A1    Sep. 21, 2023

Related U.S. Application Data

(60) Division of application No. 16/577,759, filed on Sep. 20, 2019, now Pat. No. 11,704,355, which is a continuation of application No. PCT/KR2017/003117, filed on Mar. 23, 2017.

(51) Int. Cl.
| | |
|---|---|
| *G06F 16/438* | (2019.01) |
| *G06N 20/00* | (2019.01) |
| *G06V 20/00* | (2022.01) |
| *G06V 20/40* | (2022.01) |

(52) U.S. Cl.
CPC ......... *G06F 16/4393* (2019.01); *G06N 20/00* (2019.01); *G06V 20/35* (2022.01); *G06V 20/41* (2022.01); *G06V 20/47* (2022.01)

(58) Field of Classification Search
CPC .... G06F 16/4393; G06V 20/35; G06V 20/41; G06V 20/47; G06V 2201/10
See application file for complete search history.

(56) References Cited

U.S. PATENT DOCUMENTS

| | | | |
|---|---|---|---|
| 9,460,123 B1 | 10/2016 | Strutt | |
| 9,875,258 B1 | 1/2018 | Hsiao et al. | |
| 10,372,981 B1* | 8/2019 | Pashintsev | ............... G06T 7/60 |

(Continued)

FOREIGN PATENT DOCUMENTS

| | | |
|---|---|---|
| CN | 101584001 A | 11/2009 |
| CN | 104735468 A | 6/2015 |

(Continued)

OTHER PUBLICATIONS

International Search Report PCT/ISA/210 for International Application No. PCT/KR2017/003117 dated Dec. 15, 2017.

(Continued)

*Primary Examiner* — Solomon G Bezuayehu
(74) *Attorney, Agent, or Firm* — Harness, Dickey & Pierce, P.L.C.

(57) ABSTRACT

A method and a system for producing a story video are provided. A method for producing a story video, according to one embodiment, can produce a specific story video by determining a theme of a story that is suitable for collected videos and selecting and arranging an appropriate video for each frame of a template associated with the theme.

8 Claims, 10 Drawing Sheets

(56) References Cited

U.S. PATENT DOCUMENTS

| | | | |
|---|---|---|---|
| 10,650,188 B2 | 5/2020 | Kasina | |
| 2004/0109674 A1* | 6/2004 | Ohmori | H04N 5/775 386/331 |
| 2006/0222244 A1 | 10/2006 | Haupt et al. | |
| 2007/0027839 A1* | 2/2007 | Ives | G06F 16/9577 |
| 2008/0126942 A1 | 5/2008 | Lee et al. | |
| 2008/0189660 A1* | 8/2008 | Nakagawa | G06F 16/4393 715/840 |
| 2008/0306995 A1* | 12/2008 | Newell | G06F 16/51 707/E17.031 |
| 2010/0005485 A1 | 1/2010 | Tian et al. | |
| 2011/0119625 A1 | 5/2011 | Moon | |
| 2011/0280497 A1* | 11/2011 | Berger | G06V 40/172 382/306 |
| 2012/0082401 A1 | 4/2012 | Berger et al. | |
| 2012/0274846 A1 | 11/2012 | Kimura et al. | |
| 2014/0086508 A1 | 3/2014 | Tang et al. | |
| 2015/0079573 A1 | 3/2015 | Haseltine et al. | |
| 2015/0295942 A1 | 10/2015 | Tao | |
| 2015/0356101 A1 | 12/2015 | Cohen et al. | |
| 2016/0004695 A1 | 1/2016 | Yang et al. | |
| 2016/0203386 A1* | 7/2016 | Porecki | G06T 11/60 382/159 |
| 2016/0365114 A1 | 12/2016 | Galant et al. | |
| 2017/0017844 A1* | 1/2017 | Jeong | H04N 21/4312 |
| 2017/0068643 A1* | 3/2017 | Shamir | G06F 16/5838 |
| 2017/0098138 A1 | 4/2017 | Wang et al. | |
| 2019/0251471 A1 | 8/2019 | Morita et al. | |
| 2019/0258907 A1* | 8/2019 | Rezende | G06T 7/90 |

FOREIGN PATENT DOCUMENTS

| | | |
|---|---|---|
| CN | 105224581 A | 1/2016 |
| CN | 106528751 A | 3/2017 |
| JP | 2011-134302 A | 7/2011 |
| KR | 2009-0091311 A | 8/2009 |
| KR | 2010-0001270 A | 1/2010 |
| KR | 2015-0011651 A | 2/2015 |
| KR | 2016-0087222 A | 7/2016 |
| WO | WO-2016157150 A1 | 10/2016 |

OTHER PUBLICATIONS

Office Action for Japanese Patent Application No. 2019-552476 dated Oct. 27, 2020.

Office Action for corresponding Chinese patent application No. 201780088803.9. dated Apr. 21, 2021.

* cited by examiner

METHOD AND SYSTEM FOR PRODUCING STORY VIDEO

CROSS-REFERENCE TO RELATED APPLICATION(S)

This U.S. non-provisional patent application is a divisional of U.S. application Ser. No. 16/577,759, filed Sep. 20, 2019, which is a continuation of International Application PCT/KR2017/003117, filed Mar. 23, 2017, the entire contents of each of which are incorporated herein, by reference.

BACKGROUND

1. Field

Example embodiments relate to a method and system for producing a story image, a computer program stored in a non-transitory computer-readable recording medium to perform a story image production method on a computer in conjunction with the computer, and the recording medium.

2. Related Art

There are some related arts for generating and producing an animation or a video by collecting images of a user and by editing the collected images. For example, in the related art, in response to a user selecting a portion of images stored on a terminal or images backed up on a web, an animation or a video is generated and provided by combining the selected images and additionally applying a sound or an image effect. For example, an apparatus and method for generating a slide video, that is, technology for combining a desired number of captured images in order in which the images are captured and generating the captured images into a single video file is disclosed in Korean Laid-Open Publication No. 10-2010-0001270.

However, such related arts merely generate an animation or a video by simply combining images selected by a user from among stored images or images captured under a predetermined condition in predetermined order, for example, in order in which images are selected by the user, in order in which the images are captured, in order in which the images are stored, file names of the images, or in order of a time at which the images are captured, and neither generate a story image by selecting images suitable for a specific story nor provide a story suitable for current images.

SUMMARY

One example embodiment provides a story image production method and system that may produce a specific story image by determining a theme of a story suitable for collected images, and by selecting and arranging a suitable image for each frame of a template associated with the theme.

One example embodiment provides a story image production method and system that may generate a story suitable for collected images or select a story suitable for the collected images from among predefined stories and may produce a story image suitable for the generated or selected story by selecting and arranging a suitable image for each frame of a template corresponding to the generated or selected story.

According to at least some example embodiments of the inventive concepts, a method of producing a story image includes collecting a plurality of images; extracting caption information and meta information from each of the collected plurality of images; classifying the collected plurality of images based on the extracted caption information and meta information; determining a theme of a story to be produced based on the classified images, the theme being associated with one or more templates; selecting a template from among the one or more templates associated with the determined theme of the story, each template from among the one or more templates including, a plurality of frames for arranging images, and for each frame from among the plurality of frames, at least one keyword or sentence corresponding to the frame; for each frame from among the plurality of frames included in the selected template, selecting an image from among the collected plurality of images, based on the at least one keyword or sentence corresponding to the frame and at least one of the caption information and the meta information extracted from the selected image; and generating the story image by arranging the selected images in the frames, from among the plurality of frames included in the selected template, for which the selected images were selected.

The collected plurality of images may include one of images that are stored in a local storage included in a terminal of a user and images that are stored on a web in association with an account of a social network service of the user.

For each image from among the collected plurality of images, the caption information extracted from the image may include text information acquired through a machine learning-based image analysis of the image, and the meta information extracted from the image may include information about a generation time at which the image was generated and a generation location at which the image was generated.

The classifying of the collected plurality of images may include classifying each collected image into a category, from among plurality of categories, based on at least two of the text information, the generation time, and the generation location extracted from the collected image, each category may correspond to a theme, and the determining of the theme of the story may include, selecting a category, from among the plurality of categories, based on total numbers of images that have been classified into each of the plurality of categories, and determining, as the theme of the story, the theme corresponding to the selected category.

For at least a first frame from among the plurality of frames included in the selected template, the selecting of an image from among the collected plurality of images may include selecting an image from among the images classified into the selected category by comparing a keyword or a sentence corresponding to the first frame to at least one keyword extracted based on text information and meta information of images classified into the selected category.

A non-transitory computer-readable recording medium may include computer-executable instructions that, when executed by a processor, cause the processor to perform the method of producing a story image.

According to at least some example embodiments, a method of producing a story image includes collecting a plurality of images; extracting caption information and meta information from each of the collected plurality of images; based on the extracted caption information and meta information, generating a new story or selecting a single story from among previously generated stories; generating a template corresponding to the generated or selected story, the generated template comprising a plurality of frames for arranging images, at least one keyword or sentence associated with the generated or selected story corresponding to each of the plurality of frames; comparing the extracted caption information and meta information to the at least one keyword or sentence corresponding to the plurality of frames, and selecting an image for each of a plurality of frames included in the generated template from among the collected plurality of images; and generating the story image by arranging the selected image in each of the plurality of frames.

For each image from among the collected plurality of images, the caption information extracted from the image may include text information acquired through a machine learning-based image analysis of the image, and the meta information extracted from the image may include information about a generation time at which the image was generated and a generation location at which the image was generated.

The generating a new story or selecting a single story from among previously generated stories may include, classifying the collected plurality of images into a plurality of categories based on at least two of the text information, the generation time, and the generation location, selecting a category, from among the plurality of categories, based on a number of images for each category, defining the new story using, a theme of the selected category, and at least one keyword included in the text information, or selecting the single story by, comparing the previously generated stories to the theme of the selected category and the at least one keyword, and selecting the single story from among the previously generated stories based on the comparison.

The selecting of an image may include comparing a keyword or a sentence corresponding to a first frame among the plurality of frames to at least one keyword extracted based on text information and meta information of images classified into the selected category, and selecting an image to be arranged in the first frame from among the images classified into the selected category.

The previously generated stories may be generated based on caption information extracted from an image included in a pre-generated story image.

According to at least some example embodiments, a system for producing a story image includes memory storing computer-executable instructions; and one or more processors configured to execute the computer executable instructions such that the one or more processors are configured to, collect a plurality of images, extract caption information and meta information from each of the collected plurality of images, classify the collected plurality of images based on the extracted caption information and meta information, determine a theme of a story to be produced based on the classified images, the theme being associated with one or more templates, select a template from among the one or more templates associated with the determined theme of the story, each template from among the one or more templates including, a plurality of frames for arranging images, and for each frame from among the plurality of frames, at least one keyword or sentence corresponding to the frame, for each frame from among the plurality of frames included in the selected template, select an image from among the collected plurality of images, based on the at least one keyword or sentence corresponding to the frame and at least one of the caption information and the meta information extracted from the selected image, and generate the story image by arranging the selected images in the frames, from among the plurality of frames included in the selected template, for which the selected images were selected.

The one or more processors may be configured to execute the computer executable instructions such that the one or more processors are further configured to, for each image from among the collected plurality of images, the caption information extracted from the image includes text information acquired through a machine learning-based image analysis of the image, and the meta information extracted from the image includes information about a generation time at which the image was generated and a generation location at which the image was generated.

The one or more processors may be configured to execute the computer executable instructions such that the one or more processors are further configured such that, the classifying of the collected plurality of images includes classifying each collected image into a category, from among plurality of categories, based on at least two of the text information, the generation time, and the generation location extracted from the collected image, each category corresponds to a theme, and the determining of the theme of the story includes, selecting a category, from among the plurality of categories, based on total numbers of images that have been classified into each of the plurality of categories, and determining, as the theme of the story, the theme corresponding to the selected category.

The one or more processors may be configured to execute the computer executable instructions such that the one or more processors are further configured such that, for at least a first frame from among the plurality of frames included in the selected template, the selecting of an image from among the collected plurality of images includes selecting an image from among the images classified into the selected category by comparing a keyword or a sentence corresponding to the first frame to at least one keyword extracted based on text information and meta information of images classified into the selected category.

According to at least some example embodiments, a system for producing a story image includes memory storing computer-executable instructions; and one or more processors configured to execute the computer executable instructions such that the one or more processors are configured to, collect a plurality of images, extract caption information and meta information from each of the collected plurality of images, based on the extracted caption information and meta information, generate a new story or selecting a single story from among previously generated stories, generate a template corresponding to the generated or selected story, the generated template comprising a plurality of frames for arranging images, at least one keyword or sentence associated with the generated or selected story corresponding to each of the plurality of frames, compare the extracted caption information and meta information to the at least one keyword or sentence corresponding to the plurality of frames, and select an image for each of a plurality of frames included in the generated template from among the collected plurality of images, and generate the story image by arranging the selected image in each of the plurality of frames.

The one or more processors may be configured to execute the computer executable instructions such that the one or more processors are further configured such that, for each image from among the collected plurality of images, the caption information extracted from the image includes text information acquired through a machine learning-based image analysis of the image, and the meta information extracted from the image includes information about a generation time at which the image was generated and a generation location at which the image was generated.

The one or more processors may be configured to execute the computer-executable instructions such that the one or more processors are further configured such that the generating a new story or selecting a single story from among previously generated stories includes, classifying the collected plurality of images into a plurality of categories based on at least two of the text information, the generation time, and the generation location, selecting a category, from among the plurality of categories, based on a number of images for each category, defining the new story using, a theme of the selected category, and at least one keyword included in the text information, or selecting the single story by, comparing the previously generated stories to the theme of the selected category and the at least one keyword, and selecting the single story from among the previously generated stories based on the comparison.

According to some example embodiments, it is possible to produce a specific story image by determining a theme of a story suitable for collected images, and by selecting and arranging a suitable image for each frame of a template associated with the theme.

According to some example embodiments, it is possible to generate a story suitable for collected images or select a story suitable for the collected images from among predefined stories and to produce a story image suitable for the generated or selected story by selecting and arranging a suitable image for each frame of a template corresponding to the generated or selected story.

BRIEF DESCRIPTION OF DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Hereinafter, example embodiments will be described with reference to the accompanying drawings.

A story image production system according to example embodiments may be configured through an electronic device or a server, which is described below, and a story image production method according to the example embodiments may be performed through the electronic device or the server. Here, a computer program according to at least one example embodiment may be installed and executed on the electronic device or the server, and the electronic device or the server may perform the story image production method under control of the executed computer program. The aforementioned computer program may be stored in a non-transitory computer-readable recording medium to perform the story image production method on a computer in conjunction with the electronic device or the server configured as the computer.

In the example embodiments, the term "image" may be used as a meaning that includes visual contents, for example, a photo, a video, an animation, and the like.

Figure 1:
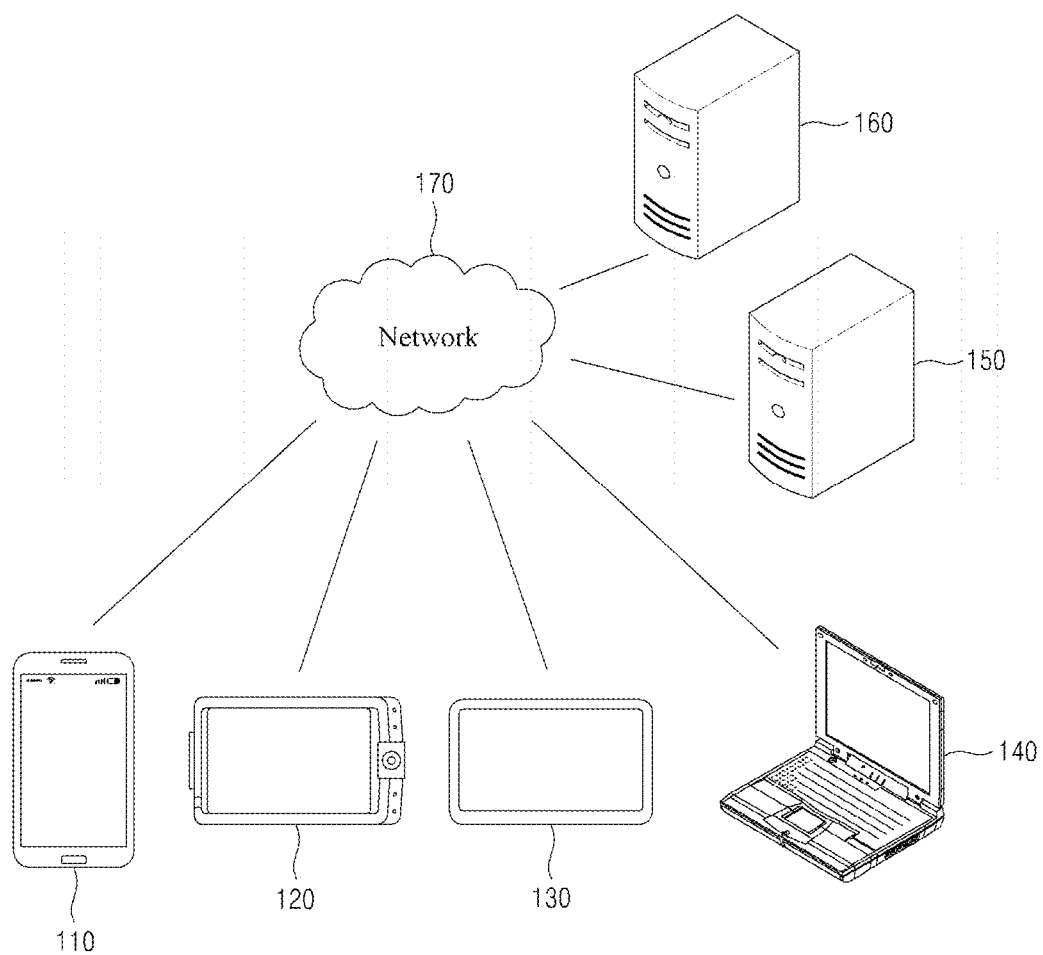
FIG. 1 is a diagram illustrating an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices or a number of servers is not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device (1) 110, the electronic device (1) 110 may indicate one of various physical devices capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170. In detail, the server 150 may provide, as the first service, a service (e.g., a story image production service, a messaging service, and a mail service content transmission service) desired by a corresponding application through the application as the computer program installed and executed on the plurality of electronic devices 110, 120, 130, and 140. As another example, the server 160 may provide, as the second service, a service for distributing a file for installing and executing the application to the plurality of electronic devices 110, 120, 130, and 140.

Figure 2:
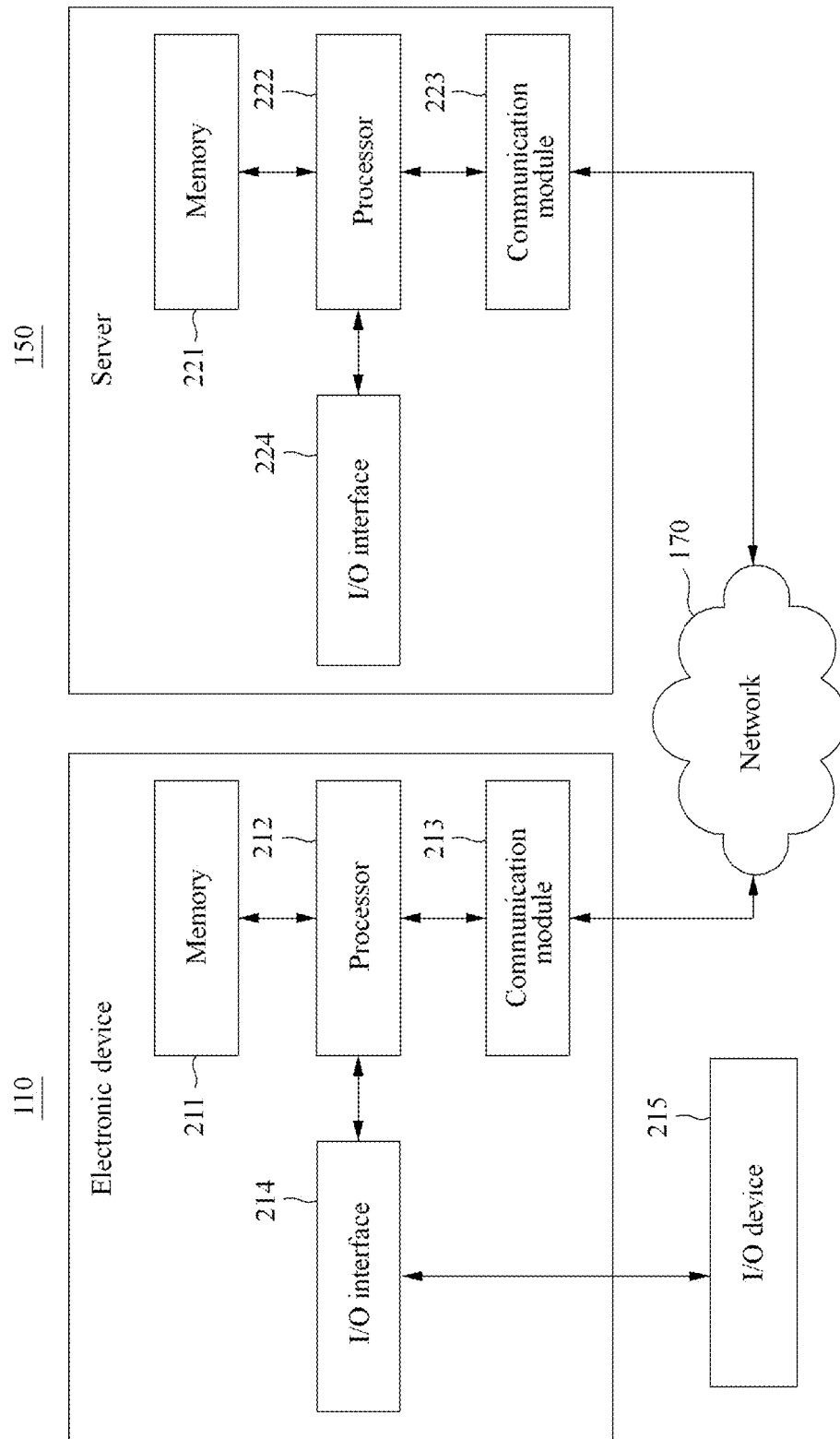
FIG. 2 is a block diagram illustrating a configuration of an electronic device and a server according to at least one example embodiment.

FIG. 2 is a block diagram illustrating an example of an electronic device and a server according to at least one example embodiment. FIG. 2 illustrates a configuration of the electronic device (1) 110 as an example for a single electronic device and illustrates a configuration of the server 150 as an example for a single server. Also, other electronic devices 120, 130, and 140, or the server 160 may have the same or similar internal configuration to that of the electronic device (1) 110 or the server 150.

Referring to FIG. 2, the electronic device (1) 110 may include a memory 211, a processor 212, a communication module 213, and an input/output (I/O) interface 214, and the server 150 may include a memory 221, a processor 222, a communication module 223, and an I/O interface 224. For the purpose of simplicity, some descriptions that may apply, generally, to both of the memories 211 and 221, both of the processors 212 and 222, or both of the communication modules 213 and 233, will be described below, with reference to "the memory 211, 221," "the processor 212, 222," or "the communication module 213, 233." However, according to at least some example embodiments, the memory 211, processor 212 and communication module 213 are separate from, and may have structures that differ from, the memory 221, processor 222 and communication module 223, respectively.

The memory 211, 221 may include a permanent storage device, such as random access memory (RAM), read only memory (ROM), and disk drive, as a non-transitory computer-readable recording medium. Here, the permanent mass storage device such as ROM and disk drive may be included in the electronic device (1) 110 or the server 150 as a permanent storage device separate from the memory 211, 221. Also, an operating system (OS) or at least one program code, for example, a code for browser installed and executed on the electronic device (1) 110 or an application installed on the electronic device (1) 110 to provide a specific service, may be stored in the memory 211, 221. Such software components may be loaded from another non-transitory computer-readable recording medium separate from the memory 211, 221. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable recording medium. For example, at least one program may be loaded to the memory 211, 221 based on a computer program, for example, the application, installed by files provided over the network 170 from developers or a file distribution system, for example, the server 160, which provides an installation file of the application.

According to at least some example embodiments, the processor 212, 222 is a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

The processor 212, 222 may be configured to process instructions of a computer program by performing basic arithmetic operations, logic operations, and I/O operations. The instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device (1) 110 and the server 150 over the network 170, and may provide a function for communication between the electronic device (1) 110 and/or the server 150 and another electronic device, for example, the electronic device (2) 120 or another server, for example, the server 160. For example, the processor 212 of the electronic device (1) 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device (1) 110 through the communication module 213 of the electronic device (1) 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the aforementioned permanent storage device, further includable in the electronic device (1) 110.

The I/O interface 214 may be a device used for interface with an I/O device 215. For example, an input device may include a device, such as a keyboard and a mouse, and an output device may include a device, such as a display and a speaker. As another example, the I/O interface 214 may be a device for interface with an apparatus in which an input function and an output function are integrated into a single function, such as a touchscreen. The I/O device 215 may be configured as a single device with the electronic device (1) 110. Also, the I/O interface 224 of the server 150 may be a device for interface with a device (not shown) for an input or an output connectable to the server 150 or includable in the server 150. In detail, when processing instructions of the computer program loaded to the memory 211, the processor 212 of the electronic device (1) 110 may display a service screen configured using data provided from the server 150 or the electronic device (2) 120, or may display content on a display through the I/O interface 214.

According to other example embodiments, the electronic device (1) 110 and the server 150 may include a greater number of components than a number of components shown in FIG. 2. However, there is no need to clearly illustrate many components according to the related art. For example, the electronic device (1) 110 may include at least a portion of the I/O device 215, or may further include other components, for example, a transceiver, a global positioning system (GPS) module, a camera, a variety of sensors, a database (DB), and the like. In detail, if the electronic device (1) 110 is a smartphone, the electronic device (1) 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
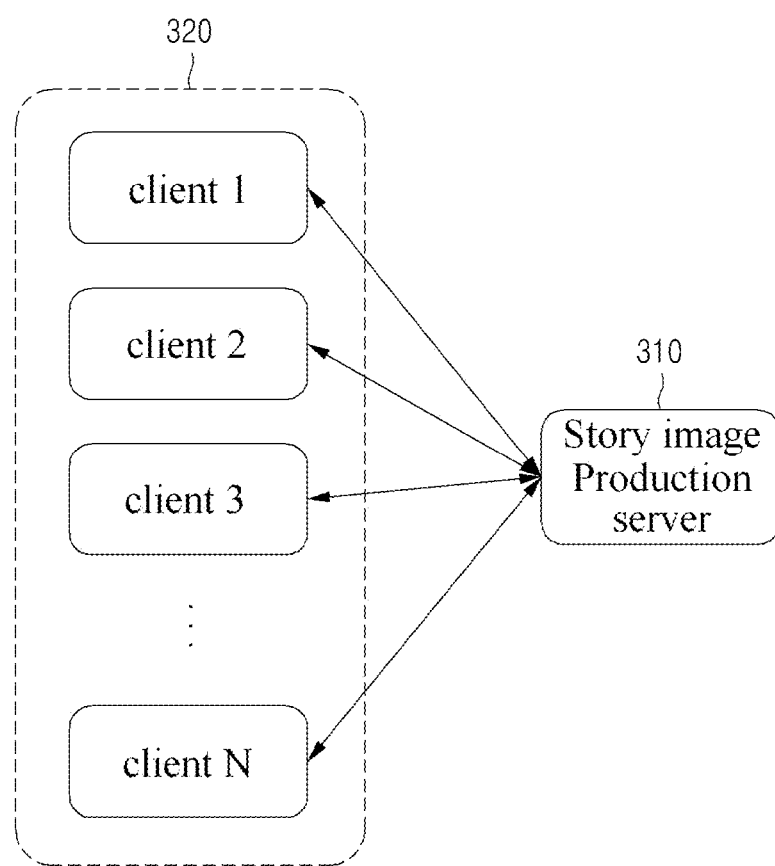
FIG. 3 illustrates an example of an environment of producing a story image according to at least one example embodiment.

FIG. 3 illustrates an example of an environment of producing a story image according to at least one example embodiment. FIG. 3 illustrates at least one example embodiment in which a story image production server 310 provides a story image production service to N clients 320. For example, in response to a specific client, for example, a client 1, among the N clients, the story image production server 310 may generate a story image for the corresponding client and may provide the story image to the corresponding client. Depending on example embodiments, the story image production server 310 may generate an arbitrary story image without a separate request from a client and may recommend the generated arbitrary story image to the corresponding client. Here, the story image production server 310 may correspond to the aforementioned server 150 and the specific client may correspond to one of the plurality of electronic devices 110, 120, 130, and 140.

A story image (or a story video) may be generated using at least a portion of images according to a story. For example, When the story or a theme of the story is determined, the story image may be generated using at least a portion of images related to the story or the theme of the story. Also, the images may associate with a specific client. For example, a story image for a corresponding client may be generated based on at least a portion of images stored in a local storage included in a terminal of a user on which the specific client is installed and/or at least a portion of images stored on a web in association with an account of a social network service of a user of the corresponding client. To this end, the story image production server 310 may collect a necessary plurality of images. For example, the images stored in the local storage may be automatically backed up to a database of the story image production server 310 through the client. In this case, the story image production server 310 may generate a story image for the corresponding client based on images stored in the database.

Although FIG. 3 is described based on an example of producing a story image in a server-client environment, at least some example embodiments may be configured to include a function that allows a client stored in the terminal of the user to directly produce a story image. For example, the client may include a function for producing a story image using at least a portion of the images stored in the local storage included in the terminal or at least a portion of the images stored on the web in association with the account of the social network service of the user.

Figure 4:
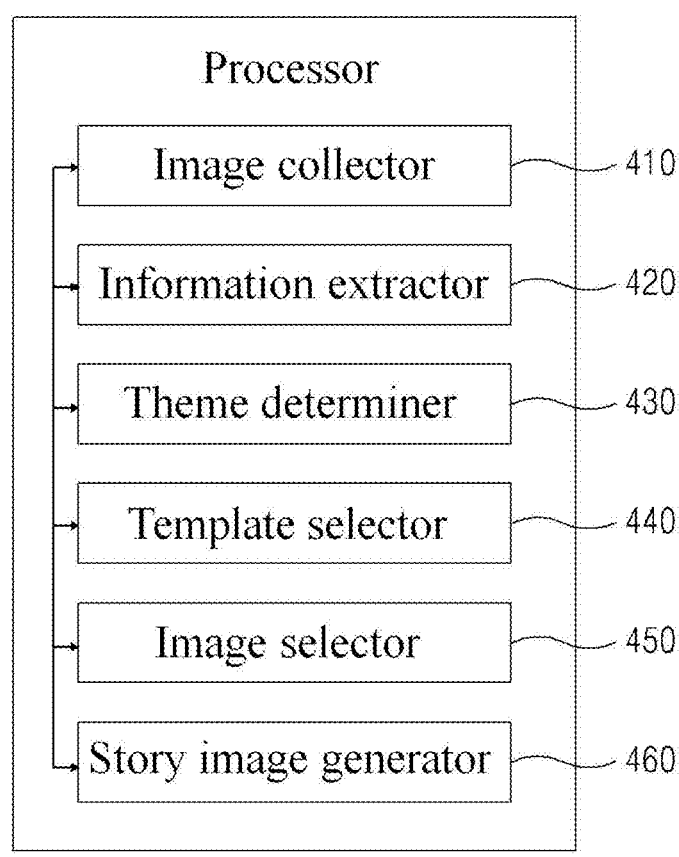
FIG. 4 is a block diagram illustrating an example of a component includable in a processor of a server according to at least one example embodiment.
Figure 5:
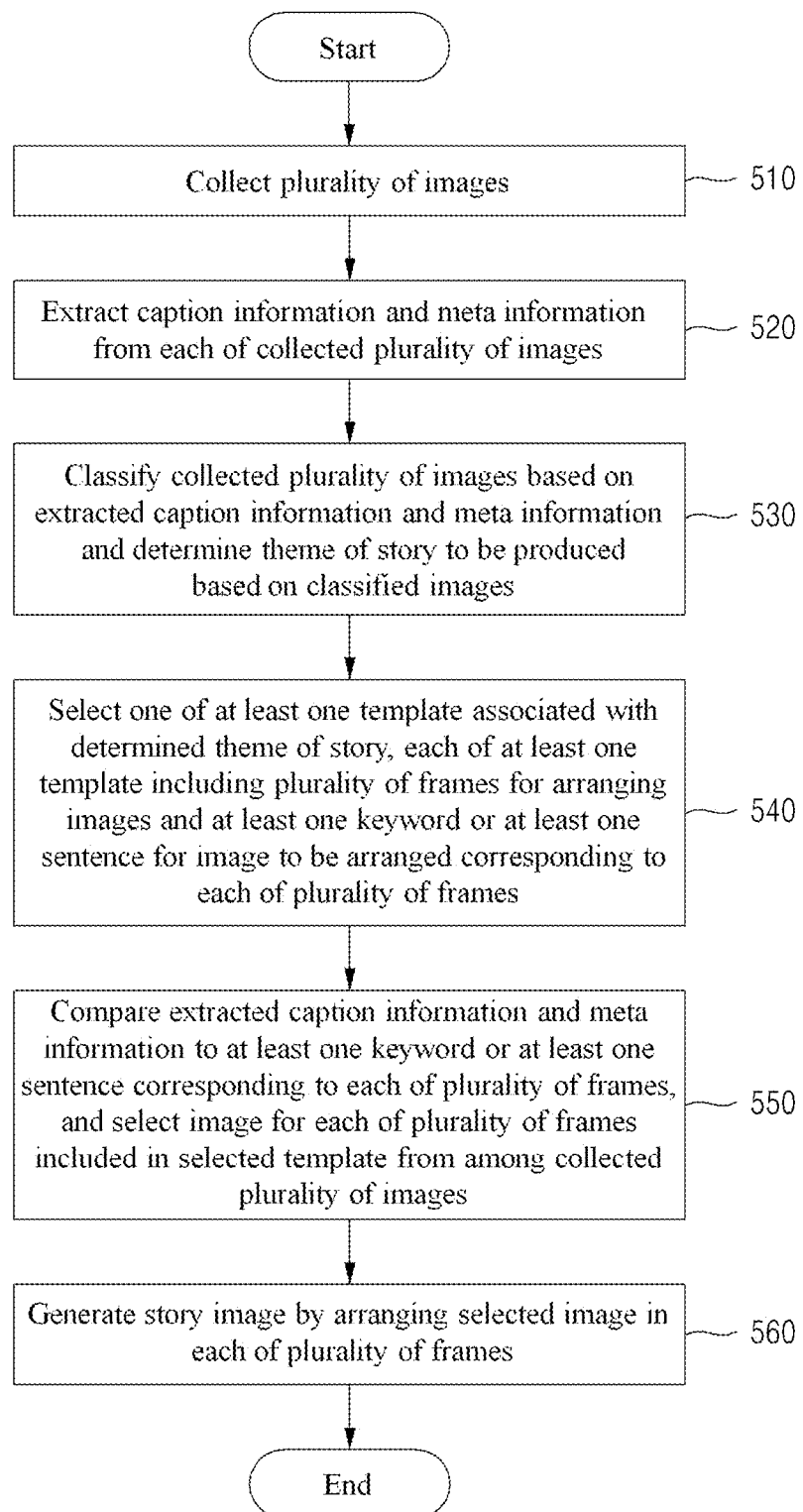
FIG. 5 is a flowchart illustrating a story image production method performed by a server according to at least one example embodiment.

FIG. 4 is a block diagram illustrating an example of a component includable in a processor of a server according to at least one example embodiment, and FIG. 5 is a flowchart illustrating a story image production method performed by a server according to at least one example embodiment.

The story image production system according to at least some example embodiments may be configured in a form of a computer apparatus, such as the server 150. Also, referring to FIG. 4, the processor 222 of the server 150 may include, as components to implement the story image production system, an image collector 410, an information extractor 420, a theme determiner 430, a template selector 440, an image selector 450, and a story image generator 460. The processor 222 and the components of the processor 222 may perform operations 510 to 560 included in the story image production method of FIG. 5. Here, the processor 222 and the components of the processor 222 may be configured to execute a control instruction according to a code of at least one program or a code of an OS included in the memory 221. Here, the components of the processor 222 may be representations of different functions of the processor 222 performed by the processor 222 in response to a control instruction provided from a code stored in the server 150. For example, any or all operations described in the present disclosure as being performed by the processor 222, or a component thereof (e.g., the components illustrated in FIGS. 4 and/or 8), may be performed by the processor 222 reading one or more program instructions corresponding to the operation from storage (e.g., memory 221), and executing the read one or more program instructions. For example, the image collector 410 may be used as a functional representation of the processor 222 such that the processor 222 may control the server 150 to collect an image in response to the control instruction.

Referring to FIG. 5, in operation 510, the image collector 410 may collect a plurality of images. The plurality of images may include one of images that are stored in a local storage included in a terminal of a user and images that are stored on a web in association with an account of a social network service (SNS) of the user. For example, the terminal of the user may correspond to the electronic device (1) 110 on which a computer program for a client is installed and the server 150 may collect images stored in a local storage of the electronic device (1) 110 over the network 170. As another example, the server 150 may also collect images from the corresponding SNS over the network 170 based on the account of the SNS of the user. In detail, images uploaded by the user to the SNS may be posted on the web in association with the account of the user and the server 150 may collect images posted in association with the account of the user among the images posted through the corresponding SNS.

In operation 520, the information extractor 420 may extract caption information and meta information from each of the collected plurality of images.

Here, the caption information may include text information acquired through a machine learning-based image analysis technology for generating a text associated with an input image from the input image. Techniques for acquiring text information associated with the image from the input image may be easily understood by those skilled in the art from the known arts. For example, TensorFlow refers to a machine learning engine developed by Google. There is a technique of extracting text information from an image as caption information using such TensorFlow as a machine learning engine used for a Google app, such as a search, a voice recognition, and a translation. The information extractor 420 may extract caption information from images collected using the known arts.

Also, the meta information may include information about a generation time at which a corresponding image is generated and a generation location at which the image is generated. Here, the information is included in the collected images. For example, a time at which a corresponding photo is captured and a geographical location, for example, global positioning system (GPS) coordinates, of a smartphone at which the photo is captured may be included in an image file generated by capturing the picture using a camera included in the smartphone. That is, the information extractor 420 may extract, from the collected images, generation time information and generation location information included in the collected images as the meta information.

The extracted caption information and meta information may be managed in association with a corresponding image. For example, an identifier of a collected image and caption information and meta information thereof may be associated with each other and thereby stored in a database.

In operation 530, the theme determiner 430 may classify the collected plurality of images based on the extracted caption information and meta information and may determine a theme of a story to be produced based on the classified images. For example, in operation 530, the theme determiner 430 may classify the collected plurality of images into a plurality of categories based on at least two of text information, a generation time of a corresponding image, and a generation location of the corresponding image included in the caption information and may determine a theme of a category selected based on a number of images for each category as the theme of the story.

For example, the theme determiner 430 may classify, into a "shopping" category, images each having a generation location around a shopping mall A and a generation time within a predetermined time interval. As another example, the theme determiner 430 may classify, into a "watch a game" category, images each having a generation location around a sports stadium B and a generation time within a predetermined time interval.

Also, if necessary, a profile registered for the user or personal information generally collected for the user may be further used to classify the images. For example, using address information stored in the profile of the user, the theme determiner 430 may classify, into a "daily" category, images each having a generation location verified to be around a location specified based on the address information and a generation time within a predetermined time interval. As another example, the theme determiner 430 may classify, into a "travel" category, images each having a generation location outside a distance preset from a location specified based on address information and a generation time within a predetermined time interval, for example, a time interval of two or more days.

In the case of using such personal information of the user, images may be classified into further various categories. For example, when a location of a home and a location of a school of a user A and a time for school and a time from school of the user are specifiable, images may be classified into a "path for school" category and a "path from school" category.

Also, text information associated with a ski may be extracted based on caption information of an image and images each having a generation location around a ski resort may be classified into a "skiing" category. Also, text information associated with a train may be extracted and images each having a generation location around a train station may be classified into a "train travel" category.

Also, a category having a highest similarity may be selected from among preset categories. As another example, a new category that is not set in advance may be generated using a keyword, for example, the aforementioned "shopping mall A", "sports stadium B", "skiing", and "train", which is extracted based on caption information or meta information may be generated.

As described, it may be easily understood by those skilled in the art that images may be classified into very various categories based on caption information meta information.

Also, as described above, the theme determiner 430 may determine a theme of a story based on the classified images. For example, a theme of a category including a largest number of images for each category may be determined as a theme of a story. As another example, one of themes of categories each including a number of images for each category greater than or equal to a threshold may be determined as a theme of a story. In detail, a list of themes of categories each including a number of images for each category greater than or equal to a threshold may be provided to the user and a theme selected by the user from the list may be determined as a theme of a story. To this end, the server 150 may transmit a list of themes to the electronic device (1) 110 over the network 170. In this case, the electronic device (1) 110 may receive the list of themes and display the received list of themes on a screen, and may provide the user with a function of selecting a theme from the list. Such displaying the list of themes and the function of selecting a theme may be provided under control of a computer program installed on the electronic device (1) 110. Also, information on the theme selected by the user may be transmitted to the server 150 over the network 170.

In operation 540, the template selector 440 may select one of at least one template associated with the determined theme of the story. Here, each of the at least one template may include a plurality of frames for arranging images and at least one keyword and/or at least one sentence for an image to be arranged may correspond to each of the plurality of frames.

For example, at least one template associated with a theme of a corresponding category may be generated and set in advance with respect to preset categories. Here, the template selector 440 may select a single template from among the templates that are generated and set in advance in association with the determined theme of the story. Alternatively, the user may directly generate and set a template in association with the determined theme of the story. In this case, the computer program installed on the electronic device (1) 110 may provide a function of generating and setting a template. For example, the computer program may receive a number of frames to be included in a template that is to be generated and a keyword and/or a sentence corresponding to each frame. In detail, to generate a template associated with a "travel" theme, a number of frames may be designated as 5 and a function of receiving a keyword and/or a sentence for each of the five frames may be provided to the user. Here, the keyword and/or the sentence corresponding to the frame may be used to select an image to be arranged in the corresponding frame.

In operation 550, the image selector 450 may compare the extracted caption information and meta information to the at least one keyword or the at least one sentence corresponding to each of the plurality of frames, and may select an image for each of a plurality of frames included in the selected template from among the collected plurality of images. For example, the image selector 450 may compare a keyword or a sentence corresponding to a first frame among the plurality of frames to at least one keyword extracted based on text information and meta information of images classified into the selected category, and may select an image to be arranged in the first frame from among the images classified into the selected category.

In detail, when a sentence corresponding to the first frame is "skiing", text information included as caption information of a first image is "a man is skiing", and a location is identified as "ski resort A" based on a generation location of the first image, the first image may be selected as an image for the first frame.

In operation 560, the story image generator 460 may generate a story image by arranging the selected image in each of the plurality of frames. For example, when five images are selected for five frames, respectively, the selected five images may be arranged in the respective corresponding frames and a story image may be generated through the images. Here, the five images are selected for the respective individual frames in story order of a template. Accordingly, a highly well-made story image compared to images combined simply in storage order or capturing order may be provided.

As described above, a story image production system according to another example embodiment may be configured in a form of a computer apparatus such as the aforementioned electronic device (1) 110. In this case, the aforementioned components, the image collector 410, the information extractor 420, the theme determiner 430, the template selector 440, the image selector 450, and the story image generator 460 may be included in the processor 212 of the electronic device (1) 110. The story image production method of FIG. 5 may be performed through the processor 212 of the electronic device (1) 110 and the components thereof. For example, operations of one or more of the image collector 410, the information extractor 420, the theme determiner 430, the template selector 440, the image selector 450, and the story image generator 460 may be implemented by the processor 212 reading one or more program instructions corresponding to the operation from storage (e.g., memory 211), and executing the read one or more program instructions. For example, in operation 510, the image collector 410 may collect images stored in the local storage of the electronic device (1) 110 or may collect images from an SNS using an SNS account of the user of the electronic device (1) 110.

Figure 6:
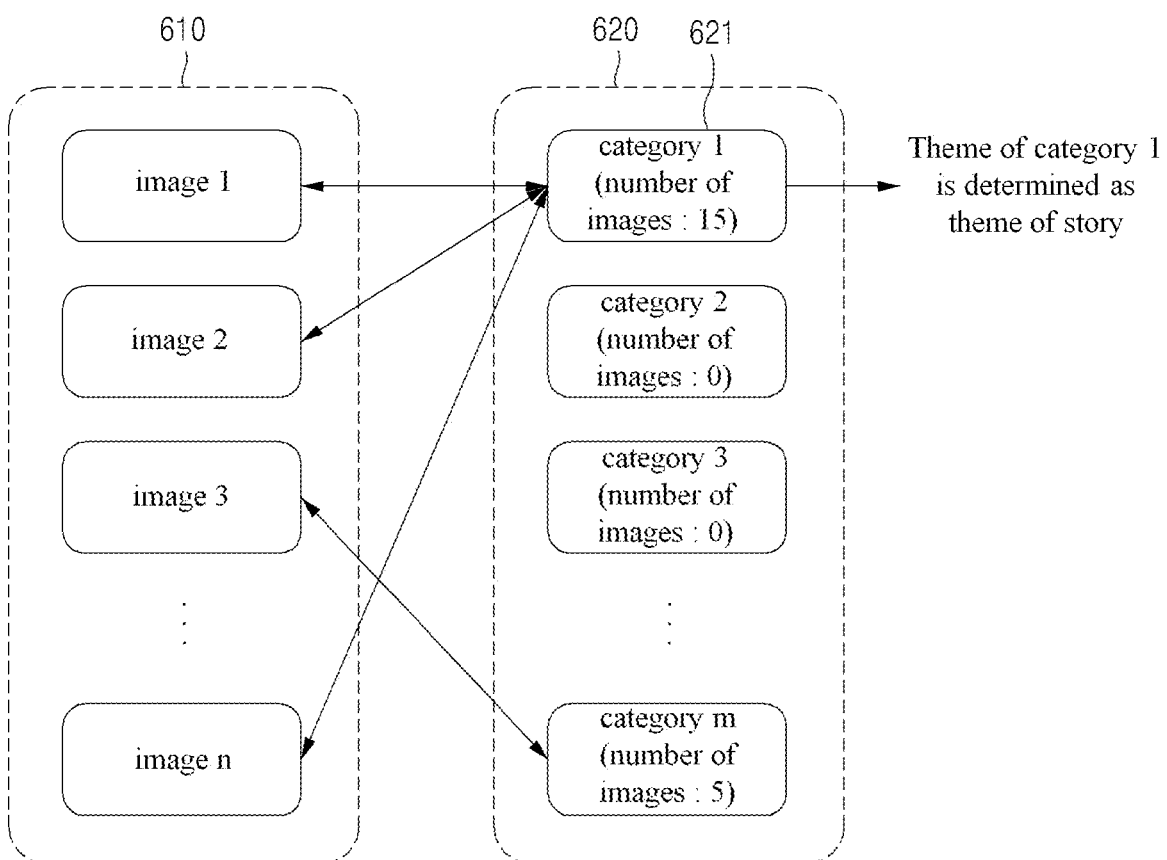
FIG. 6 illustrates an example of a process of determining a theme of a story according to at least one example embodiment.

FIG. 6 illustrates an example of a process of determining a theme of a story according to at least one example embodiment. FIG. 6 illustrates an example in which n images 610 are classified into m preset categories 620. As described above, a new category may be added based on caption information and meta information extracted from the n images 610. For clarity, a description is made based on an example in which the n images 610 are classified into the m preset categories 620.

Referring to FIG. 6, according to at least some example embodiments, a theme of a category 1 621 into which 15 images, which is a largest number of images, are classified is determined as a theme of a story. As described above, the story image production system may provide a user with a list of themes of categories each including a number of images greater than or equal to a threshold and may receive a theme selected by the user from the list as a theme of a story.

Once the theme of the story is determined, a template associated with the determined theme may be selected and images to be arranged in frames included in the template may be selected. Here, the images to be arranged in the corresponding frames may be selected from among the entire collected images and may be selected from among images that are classified into "category 1" that is a category selected to reduce an amount of calculation.

Figure 7:
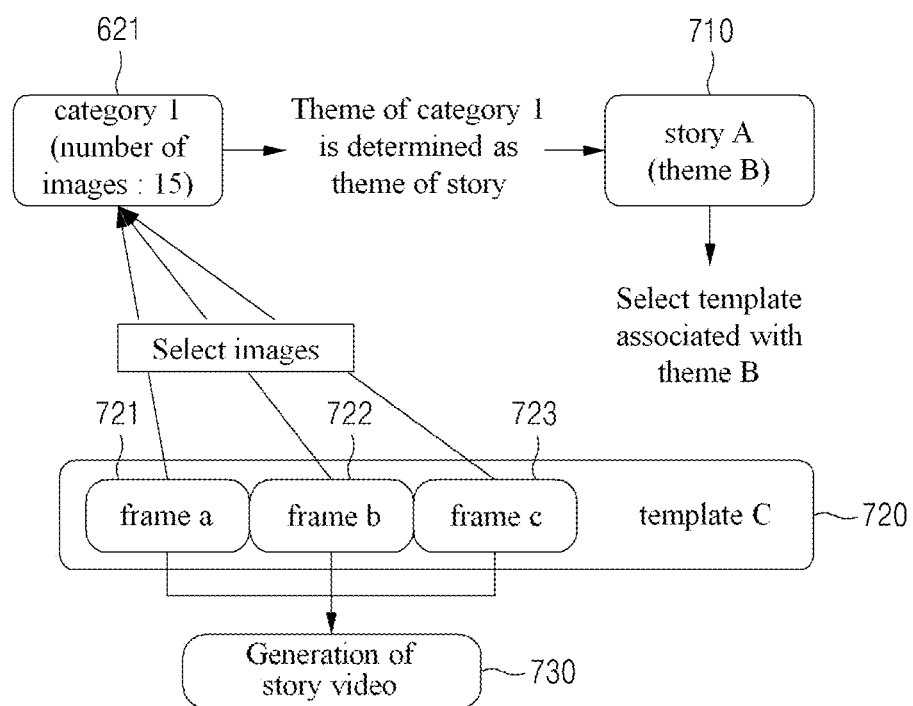
FIG. 7 illustrates an example of selecting an image to be arranged in each of frames included in a template according to at least one example embodiment.

FIG. 7 illustrates an example of selecting an image to be arranged in each of frames included in a template according to at least one example embodiment. FIG. 7 illustrates an example in which a theme of the category 1 621 into which 15 images are classified is determined as a theme (theme B) of a story A 710. Here, a template C 720 associated with the theme B may be selected.

The template C 720 may be one of templates generated and set in advance for the theme B and, depending on example embodiments, may be a template that is directly generated by the user in association with the theme B.

An example in which the selected template C 720 includes a frame a 721, a frame b 722, and a frame c 723 is described with reference to FIG. 7. There is no need to particularly limit a number of frames includable in a single template and those skilled in the art can easily understand that the number of frames may be set to a desired number if necessary.

The story image production system may select an image to be arranged in each of the frame a 721, the frame b 722, and the frame c 723 from among the 15 images classified into the category 1 621. Depending on example embodiments, an image to be arranged in each of frames may be selected from among the entire collected images and may be selected from the selected category, for example, the category 1 621 as in the example illustrated in FIG. 7, to increase correlation with a story and to reduce an amount of calculation.

Once the images to be arranged in the respective frames are selected, the story image production system may generate a story image by arranging the images in the frames. Here, since the arranged images are selected for the respective frames according to a story, a highly well-made story image compared to images arranged simply in capturing order or storage order may be produced.

To this end, frames included in a template may include a keyword and/or a sentence according to progress of a story. The keyword and/or the sentence according to the progress of the story may be selected based on caption information and meta information extracted from images and themes of story images that are already produced, particularly, produced through edition of a person. For example, when a theme of a produced story image is "travel" and caption information extracted from images of the story image includes "a person is shopping"→"a person is sitting on a seat in an airplane"→"a person is eating"→"a person is standing at the beach"→"a person is sitting on the bed" in order of the images, a template, for example, a story plot, in which the aforementioned five pieces of caption information correspond to the five frames may be generated.

An image to be arranged with respect to a keyword or a sentence corresponding to an individual frame may be selected using a keyword or a sentence extracted from caption information and/or meta information of an image. Examples of selecting an image are described above.

Example embodiments of generating a story image by selecting and using an associated template based on a theme of collected images are described above. Hereinafter, example embodiments of generating a story image by generating or selecting a story based on collected images and by generating and using a template corresponding to the generated or selected story are described. That is, in the foregoing example embodiments, a story image is generated by selecting an image suitable for a selected theme. In the following example embodiments, a story image may be generated by generating and selecting a story based on images and then selecting an image suitable for the generated or selected story.

Figure 8:
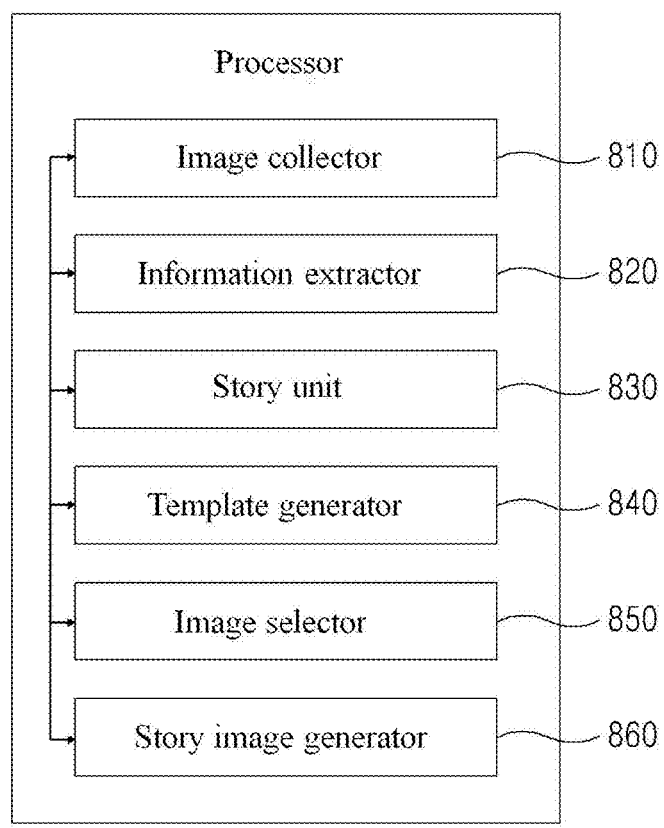
FIG. 8 is a block diagram illustrating an example of a component includable in a processor of a server according to at least one example embodiment.
Figure 9:
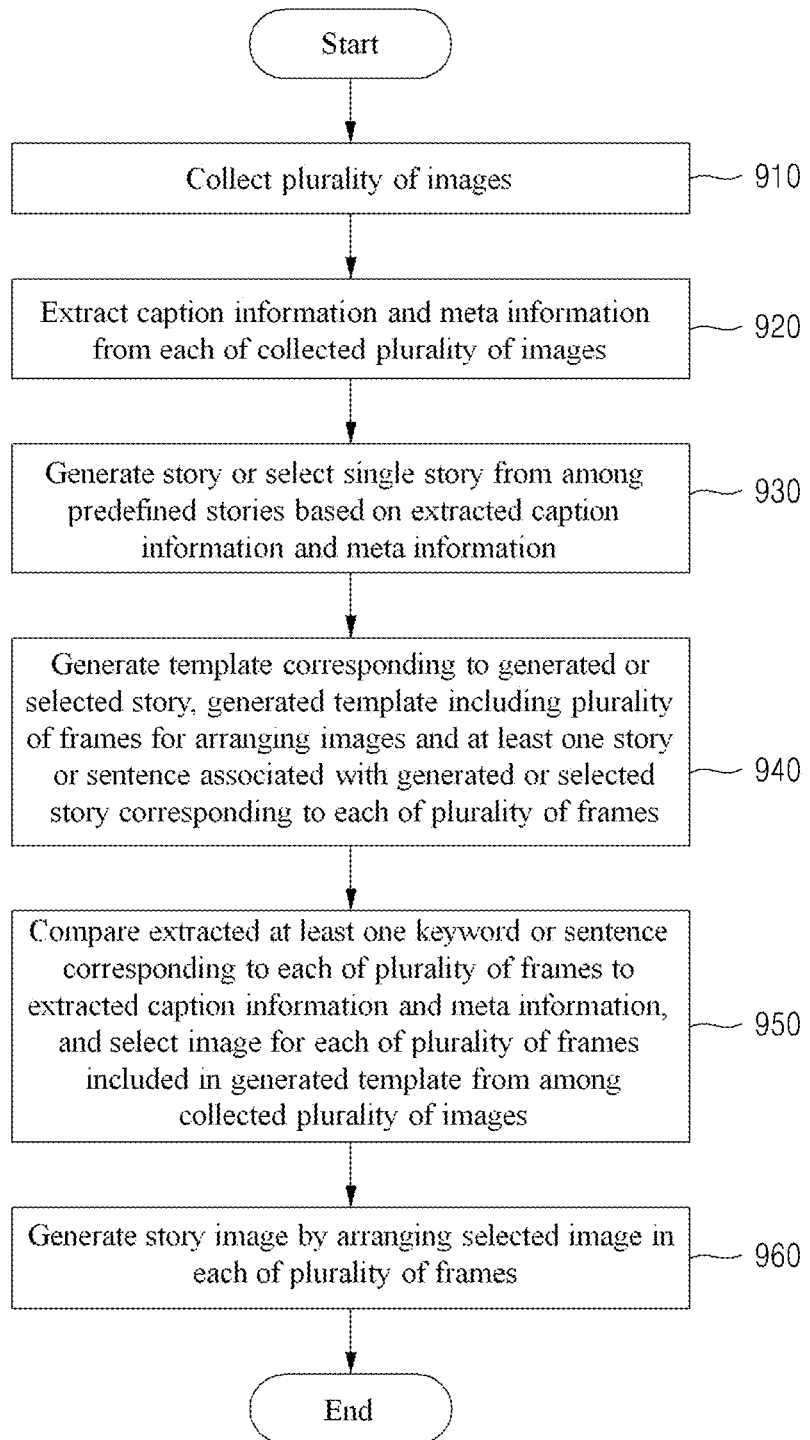
FIG. 9 is a flowchart illustrating an example of a story image production method performed by a server according to at least one example embodiment.

FIG. 8 is a block diagram illustrating an example of a component includable in a processor of a server according to at least one example embodiment, and FIG. 9 is a flowchart illustrating an example of a story image production method performed by a server according to at least one example embodiment.

A story image production system according at least some example embodiments may be configured in a form of a computer apparatus, such as the server 150. Also, referring to FIG. 8, the processor 222 of the server 150 may include, as components to implement the story image production system, an image collector 810, an information extractor 820, a story unit 830, a template generator 840, an image selector 850, and a story image generator 860. The processor 222 and the components of the processor 222 may perform operations 910 to 960 included in the story image production method of FIG. 9. Here, the processor 222 and the components of the processor 222 may be configured to execute a control instruction according to a code of an OS included in the memory 221 or a code of at least one program. Here, the components of the processor 222 may be representations of different functions of the processor 222 performed by the processor 222 in response to a control instruction that is provided from the code stored in the server 150. For example, any or all operations described in the present disclosure as being performed by the processor 222, or a component thereof (e.g., the components illustrated in FIGS. 4 and/or 8), may be performed by the processor 222 reading one or more program instructions corresponding to the operation from storage (e.g., memory 221), and executing the read one or more program instructions. For example, the image collector 810 may be used as a functional representation of the processor 222 such that the processor 222 may control the server 150 to collect an image in response to the control instruction.

Referring to FIG. 9, in operation 910, the image collector 810 may collect a plurality of images. As described above, the plurality of images may include one of images that are stored in a local storage included in a terminal of a user and images that are stored on a web in association with an account of an SNS of the user. For example, the terminal of the user may correspond to the electronic device (1) 110 on which a computer program for a client is installed and the server 150 may collect the images stored in a local storage of the electronic device (1) 110 over the network 170. As another example, the server 150 may also collect images from the corresponding SNS of the user over the network 170 based on the account of the SNS of the user. In detail, images uploaded by the user to the SNS may be posted on the web in association with the account of the user and the server 150 may collect images posted in association with the account of the user among the images posted through the corresponding SNS.

In operation 920, the information extractor 820 may extract caption information and meta information from each of the collected plurality of images.

Here, the caption information may include text information acquired through a machine learning-based image analysis technology for generating a text associated with an input image from the input image. Techniques for acquiring text information associated with the image from the input image may be easily understood by those skilled in the art from the known arts. For example, TensorFlow refers to a machine learning engine developed by Google. There is a technique of extracting text information from an image as caption information using such TensorFlow as a machine learning engine used for a Google app, such as a search, a voice recognition, and a translation. The information extractor 820 may extract caption information from images collected using the known arts.

Also, the meta information may include information about a generation time at which a corresponding image is generated and a generation location at which the image is generated. Here, the information is included in the collected images. For example, a time at which a corresponding photo is captured and a geographical location, for example, GPS coordinates, of a smartphone at which the photo is captured may be included in an image file generated by capturing the picture using a camera included in the smartphone. That is, the information extractor 820 may extract, from the corresponding collected image, generation time information and generation location information included in the collected images as the meta information.

The extracted caption information and meta information may be managed in association with a corresponding image. For example, an identifier of a collected image and caption information and meta information thereof may be associated with each other and thereby stored in a database.

In operation 930, the story unit 830 may generate a story or may select a single story from among predefined stories based on the extracted caption information and meta information. For example, the story unit 830 may classify the collected plurality of images into a plurality of categories based on at least two of the text information included in the caption information and the generation time and the generation location included in the meta information, and may define a new story using a theme of a category selected based on a number of images for each category and at least one keyword included in the text information. As another example, the story unit 830 may compare predefined stories to the theme of the category selected based on the number of images for each category and at least one keyword included in the text information and may select a single story from among the predefined stories. That is, the story unit 830 may generate a new story suitable for the collected images or may select a story suitable for the collected images from among the generated stories.

For example, when caption information extracted from images each having a generation time within a predetermined time interval among the collected images includes "a person is shopping"→"a person is sitting on a seat in an airplane"→"a person is eating"→"a person is standing at the beach"→"a person is sitting on the bed" in order of the generation time, the caption information may be defined as a new story. Alternatively, a story having order information similar to the caption information may be selected from among the predefined stories.

Alternatively, when keywords, such as "Korea/Seoul"→"Korea/Incheon Airport"→"Japan/Narita Airport", are extracted from generation locations according to order of generation times of images, the keywords according to order of the generation times may be defined as a new story.

In operation 940, the template generator 840 may generate a template corresponding to the generated or selected story. Here, the generated template may include a plurality of frames for arranging images and at least one keyword or sentence associated with the generated or selected story may correspond to each of the plurality of frames. In the aforementioned example of keywords, the template generator 840 may generate a frame 1 corresponding to "Korea/Seoul/ subway", a frame 2 corresponding to "Korea/Incheon Airport", and a frame 3 corresponding to "Japan/Narita Airport".

In operation 950, the image selector 850 may compare at least one keyword or at least one sentence corresponding to each of the plurality of frames to the extracted caption information and meta information and may select an image for each of the plurality of frames included in the selected template from among the collected plurality of images. For example, the image selector 850 may compare a keyword and/or sentence corresponding to a first frame among the plurality of frames to a keyword extracted based on text information and/or meta information of images classified into the selected category, and may select an image to be arranged in the first frame from among the images classified into the selected category.

In detail, when a keyword corresponding to a frame 1 is "Korea/Incheon Airport", an image associated with the keyword may be selected from among images classified into the selected category or the collected images. Such selection of an image may be performed by comparing the keyword "Korea/Incheon Airport" to keywords extracted based on caption information and meta information of the images.

In operation 960, the story image generator 860 may generate a story image by arranging the selected image in each of the plurality of frames. For example, when five images are selected for five frames, respectively, the selected five images may be arranged in the respective corresponding frames and a story image may be generated through the images. Here, the five images are selected for the respective individual frames in story order of a template. Accordingly, a highly well-made story image compared to images combined simply in storage order or capturing order may be provided. Also, in the example embodiment, a highly well-made story image may be produced since a story itself is generated based on the collected images or a similar story is selected from among predefined stories.

As described above, the story image production method may be performed through a function of a computer program installed on an electronic device.

Figure 10:
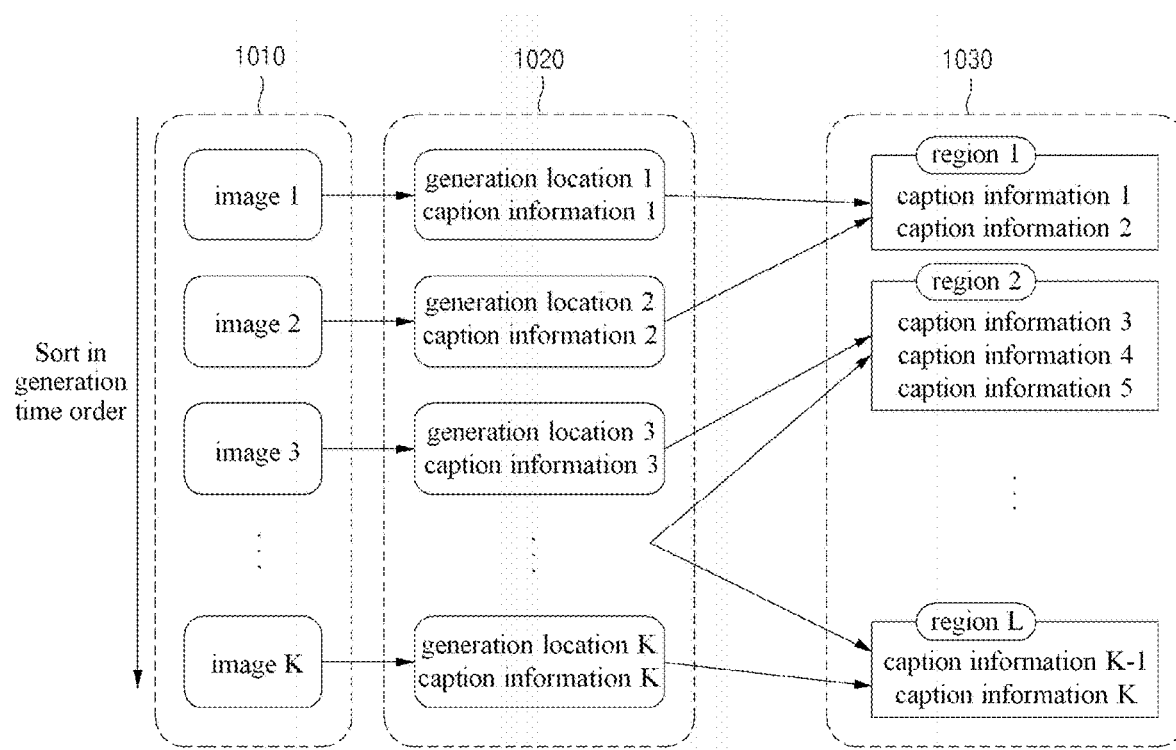
FIG. 10 illustrates an example of producing a story according to at least one example embodiment.

FIG. 10 illustrates an example of producing a story according to at least one example embodiment. FIG. 10 illustrates an example of extracting information 1020 including generation locations and caption information from the respective K images 1010 sorted in generation time order and classifying information 1030 into regions based on the generation locations. In the example embodiment, the story image production system may extract at least one keyword and/or at least sentence for each region based on caption information that is sorted in generation time order and classified into regions and may generate a story for each region. Although an example of generating a story simply using a time and a region is described with reference to FIG. 10, those skilled in the art may easily understand that the story may be generated by extracting sequences of keywords or sentences through various classifications. Also, a similar story may be selected and used from among predefined stories using sequence of the extracted keyword or sentence.

According to some example embodiments, it is possible to produce a specific story image by determining a theme of a story suitable for collected images, and by selecting and arranging a suitable image for each frame of a template associated with the theme. Also, it is possible to generate a story suitable for collected images or select a story suitable for the collected images from among predefined stories and to produce a story image suitable for the generated or selected story by selecting and arranging a suitable image for each frame of a template corresponding to the generated or selected story.

The systems or apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable storage media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable storage media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. The media may be various recording devices or storage devices in which a single piece or a plurality of pieces of hardware are combined and may be present on a network without being limited to a medium directly connected to a computer system. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of producing a story image, the method comprising:
    collecting a plurality of images;
    extracting caption information and meta information from each of the collected plurality of images;
    based on the extracted caption information and meta information, generating a new story from among previously generated stories;
    generating a template corresponding to the generated story, the generated template comprising a plurality of frames for arranging images, at least one keyword or sentence associated with the generated story corresponding to each of the plurality of frames;
    comparing the extracted caption information and meta information to the at least one keyword or sentence corresponding to the plurality of frames, and selecting an image for each of a plurality of frames included in the generated template from among the collected plurality of images; and
    generating the story image by arranging the selected image in each of the plurality of frames.

2. The method of claim 1, wherein, for each image from among the collected plurality of images,
    the caption information extracted from the image includes text information acquired through a machine learning-based image analysis of the image, and
    the meta information extracted from the image includes information about a generation time at which the image was generated and a generation location at which the image was generated.

3. The method of claim 2, wherein generating a new story from among previously generated stories includes,
    classifying the collected plurality of images into a plurality of categories based on at least two of the text information, the generation time, and the generation location,
    selecting a category, from among the plurality of categories, based on a number of images for each category,
    defining the new story using,
        a theme of the selected category, and
        at least one keyword included in the text information.

4. The method of claim 3, wherein the selecting of an image comprises:
    comparing a keyword or a sentence corresponding to a first frame among the plurality of frames to at least one keyword extracted based on text information and meta information of images classified into the selected category, and selecting an image to be arranged in the first frame from among the images classified into the selected category.

5. The method of claim 1, wherein the previously generated stories are generated based on caption information extracted from an image included in a pre-generated story image.

6. A system for producing a story image, the system comprising:
    memory storing computer-executable instructions; and
        one or more processors configured to execute the computer executable instructions such that the one or more processors are configured to, collect a plurality of images,
    extract caption information and meta information from each of the collected plurality of images,
    based on the extracted caption information and meta information, generate a new story from among previously generated stories,
    generate a template corresponding to the generated story, the generated template comprising a plurality of frames for arranging images, at least one keyword or sentence associated with the generated story corresponding to each of the plurality of frames,
    compare the extracted caption information and meta information to the at least one keyword or sentence corresponding to the plurality of frames, and select an image for each of a plurality of frames included in the generated template from among the collected plurality of images, and
    generate the story image by arranging the selected image in each of the plurality of frames.

7. The system of claim 6, wherein, the one or more processors are configured to execute the computer executable instructions such that the one or more processors are further configured such that, for each image from among the collected plurality of images,
    the caption information extracted from the image includes text information acquired through a machine learning-based image analysis of the image, and
    the meta information extracted from the image includes information about a generation time at which the image was generated and a generation location at which the image was generated.

8. The system of claim 7, wherein, the one or more processors are configured to execute the computer-executable instructions such that the one or more processors are further configured such that the generating a new story from among previously generated stories includes,
    classifying the collected plurality of images into a plurality of categories based on at least two of the text information, the generation time, and the generation location,
    selecting a category, from among the plurality of categories, based on a number of images for each category,
    defining the new story using,
        a theme of the selected category, and
        at least one keyword included in the text information.

* * * * *